(12) United States Patent
Liu et al.

(10) Patent No.: US 6,396,632 B1
(45) Date of Patent: May 28, 2002

(54) TUNABLE OPTICAL FILTER AND OPTICAL MODULATOR

(75) Inventors: Wen Liu, Nepean; Yufeng Xu, Kanata, both of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/625,175

(22) Filed: Jul. 25, 2000

(51) Int. Cl.[7] .................... G02B 27/00; G02B 6/28; G02F 1/03
(52) U.S. Cl. .................... 359/579; 359/577; 359/578; 359/260; 385/24
(58) Field of Search ................ 359/578, 579, 359/260, 577, 124, 128; 385/24; 310/329

(56) References Cited

U.S. PATENT DOCUMENTS

| | | | |
|---|---|---|---|
| 4,373,782 A | 2/1983 | Thelen | 350/166 |
| 4,709,978 A | 12/1987 | Jackel | 350/96.14 |
| 4,924,131 A * | 5/1990 | Nakayama et al. | 310/329 |
| 5,142,414 A * | 8/1992 | Koehler | 359/579 |
| 5,481,402 A | 1/1996 | Cheng et al. | 359/498 |
| 6,014,485 A | 1/2000 | Pan | 385/37 |
| 6,018,421 A | 1/2000 | Cushing | 359/589 |
| 6,269,202 B1 * | 7/2001 | Lee et al. | 385/24 |

OTHER PUBLICATIONS

Mitsunori Fukutoku, et al. "Optical Beat–Induced Crosstalk of an Acousto–Optic Tunable Filter for WDM Network Applications", Nov. 11, 1995, pp 2224–2235, Journal of Lightwave Technology, vol. 13, No. 11.
Janet L. Jackel, et al. "Acousto–Optic Tunable Filters (AOTF's) for Multiwavelength Optical Cross—Connects: Crosstalk Considerations", Jun. 6, 1996, pp 10561066, Journal of Lightwave Technology, vol. 14, No. 6.

* cited by examiner

*Primary Examiner*—Audrey Chang

(57) ABSTRACT

A tunable optical filter is based on a conventional thin film optical filter. The thickness of the thin film optical filter determines the optical properties of the filter, specifically the pass band. The thin film optical filter is arranged within a hole extending through a layer of piezoelectric material such that the periphery of the thin film optical filter is secured to the periphery of the hole. Electrodes are provided on opposite surfaces of the piezoelectric layer such that different voltage levels can be applied. The resulting deformation of the piezoelectric layer causes a difference in the thickness of the thin film optical filter thereby permitting tuning of the optical filter.

30 Claims, 4 Drawing Sheets

TUNABLE OPTICAL FILTER AND OPTICAL MODULATOR

FIELD OF INVENTION

The invention relates to an improved tunable optical filter and modulator.

BACKGROUND

Thin film bandpass filters are key components in wavelength-division multiplexing (WDM) systems, in particular density wavelength-division multiplexing (DWDM) systems. A typical thin film bandpass filter comprise a series of dielectric resonance cavities, with quarter wave thick layers of lower index material separating them. These filters are also sometimes referred to as dielectric multilayer interference filters. Many improvements in the performance of these filters, such as improved wavelength response and polarization independency, have been made. U.S. Pat. No. 6,018,421 which issued to Cushing on Jan. 25, 2000 provides a summary of known bandpass filters of this type along with disclosure of an improvement whereby the transition slopes of the filter are improved as well as removal of the ripple effect generally associated with these filters.

For WDM applications and, especially for DWDM applications, tunable optical filters are becoming useful. It is known to use thin film filters as tunable optical filters. Typically, such a tunable optical filter comprises a thin film filter mounted on a rotatable surface such that the angle of incidence of the incoming light on the filter can be altered by rotation of the surface. The change in the incident angle alters the pass band of the filter. However, these tunable filters have slow response time due to the mechanical rotation of the thin film filter. Further, because of the reflective angles created by the multilayers within the filter, the filter response becomes polarization dependent as the incident angle is altered. U.S. Pat. No. 5,481,402 which issued to Cheng et al on Jan. 2, 1996 provides an improved tunable optical filter of this nature wherein the light is passed through the filter, through a quarter wave plate and onto a reflective surface which reflects the light back through the quarter wave plate and through the filter a second time. Although this technique does improve the polarization dependency of the filter, the filter remains polarization dependent to a limited extent. Further, the tunable optical filter disclosed has the same slow response time as discussed above due to the mechanical tuning of the filter.

Other types of tunable optical filters known in the art are acoustic-optical tunable filters (AOTF) and liquid crystal tunable filters (LCTF). The AOTFs are undesirable for many applications because of the high insertion losses and because the passband of these filters is not sufficiently narrow. An example of a LCTF know in the art is disclosed in U.S. Pat. No. 5,321,539 which issued to Hirahayashi et al on Jun. 14, 1994. LCTFs are undesirable in certain circumstances due to slow response time and the polarization dependency of these filters.

Further, switches and modulators have become key components in modern optical communication systems. External modulation has become necessary for high bit rate systems, such as OC-192. Mach-Zehnder interference modulators are well known in the art and commonly used as optical modulators or switches. These interference modulators consist of a single input waveguide, an input branching region for splitting the input light into two substantially equal portions into two branch waveguides and an output waveguide. By effecting a phase shift in one branch of the waveguide relative to the other, the output light power can be altered between zero and the input light power level, depending on the phase shift. The phase shifts are generally effected by means of electrodes disposed on the substrate of one or both of the branch waveguides. Although these modulators are effective, the costs of manufacturing these devices are high and the devices have high insertion losses, are polarization dependent and have poor thermal properties.

SUMMARY OF INVENTION

The invention is based on a conventional thin film optical filter. The thickness of the thin film optical filter determines the optical properties of the filter, specifically the pass band. The thin film optical filter is arranged within a hole extending through a layer of piezoelectric material such that the periphery of the thin film optical filter is secured to the periphery of the hole. Electrodes are provided on opposite surfaces of the piezoelectric layer such that different voltage levels can be applied. The resulting deformation of the piezoelectric layer causes a difference in the thickness of the thin film optical filter thereby permitting tuning of the optical filter.

Instead of a single layer of piezoelectric material a multi-layered arrangement of many thin layers of piezoelectric material could be used. In this case the layers are sandwiched between transparent substrates and electrodes.

Although the main embodiment suggested involves an optical filter completely surrounded by the piezoelectric material, in an alternative embodiment a narrow strip of thin film optical filter is provided with piezoelectric material only along the two longer sides.

The invention also provides a method of making the novel tunable optical filter.

The improved tunable filter can also be used as a modulator or a switch. As an essentially fixed wavelength filter, the invention provides a way of fine tuning the passband of conventional thin film filters such that variations in the filter due to changes in the surrounding environment, such as temperature, can be compensated for. As a tunable filter, although the dynamic range of a filter according to the invention is less then many conventional tunable filters, the tunable filter of the invention has a quicker response time and no polarization dependency. Further, when used in a DWDM system, it allows the density of the DWDM system to be significantly increased. The filter may also be used to replace several filters in multichannel signal devices as it can be switched to selectively transmit different wavelength signals corresponding to different channels. As a modulator, the invention is inexpensive compared to conventional modulators and provides improved performance characteristics.

BRIEF DESCRIPTION OF THE DRAWINGS

Preferred embodiments of the invention will now be described by way of example with reference to the attached drawings in which.

DETAILED DESCRIPTION OF PREFERRED EMBODIMENTS

Figure 1:
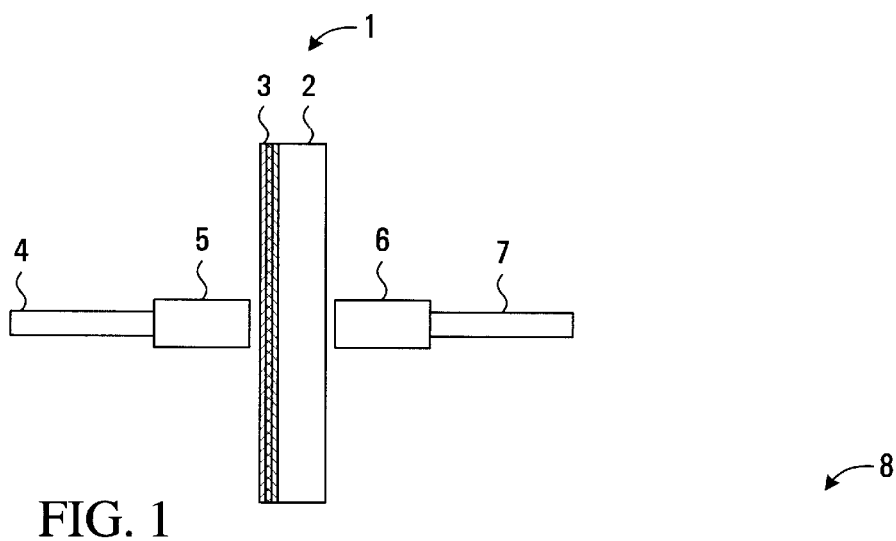
FIG. 1 is a side view of a conventional thin film optical filter.

With reference to FIG. 1, a thin film optical filter known in the art is shown. The thin film filter 1 comprises a transparent substrate 2 onto which multi-layers (perhaps as high as a few hundred layers) of dielectric films 3 are disposed to create a desired pass band wherein light with a wavelength within the pass band is transmitted through the filter while light with a wavelength outside the pass band is absorbed by the filter. Light is collimated onto the thin film filter 1 by an input waveguide 4 and a lens 5. Light transmitted by the thin film filter 1 is focused by a lens 6 into an output waveguide 7.

Figure 2:
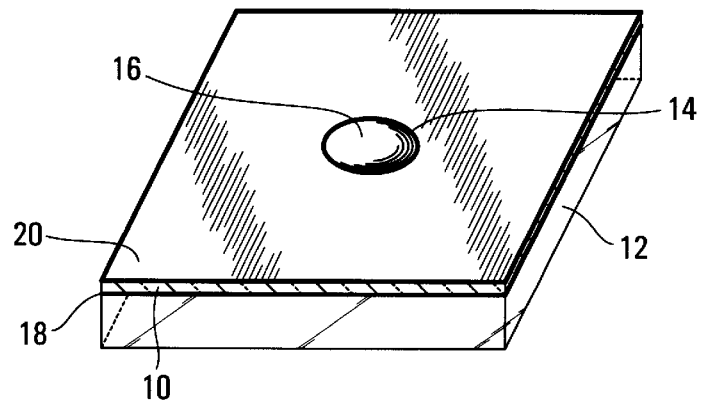
FIG. 2 is a perspective view of a tunable optical filter according to one embodiment of the invention.

With reference to FIG. 2, a tunable filter 8 according to an embodiment of the invention is shown. The filter comprises a layer of piezoelectric material 10 disposed on a transparent substrate 12 such as amorphous Quartz. PZT or other known piezoelectric materials could be used. The piezoelectric material 10 has a hole 14 therein within which a conventional thin film filter 16 is disposed. The thin film filter 16 is secured around its periphery to the piezoelectric material 10 and has a cross-sectional area sufficiently large to permit transmission of a light beam for the application for which the tunable filter is being used. The thin film filter 16 can be secured to the piezoelectric material 10 by an adhesive or simply by the bonds created as a result of the technique used to dispose it within the hole 14. Preferably, the piezoelectric material 10 is a stiffer material than the thin film filter 16. Although the hole 14 in the piezoelectric material 10 shown in the drawings has a circular cross-section, it would be understood by those skilled in the art that different cross-sectional shapes could be used.

Figures 3, 4, 5:
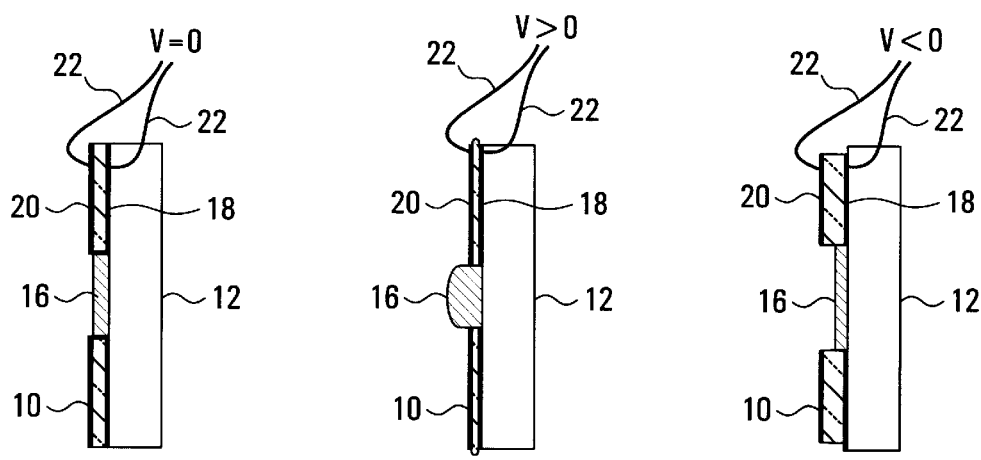
FIG. 3 is a side view of the tunable optical filter shown in FIG. 2 with a zero voltage applied across the filter.
FIG. 4 is a side view of the tunable optical filter shown in FIG. 2 with a voltage greater than zero applied across the filter.
FIG. 5 is a side view of the tunable optical filter shown in FIG. 2 with a voltage less than zero applied across the filter.

A first electrode 18 comprising a layer of conductive material is positioned between the piezoelectric material 10 and the transparent substrate 12. Similarly, a second electrode 20 comprising a layer of conductive material is disposed on the opposing surface of the piezoelectric material 10. The electrodes 18 and 20 could be made of any number of conductive materials known in the art such as Al or a Ti/Al combined film (thin Ti film plus over 95% Al film). However, the electrodes 18 and 20 must have holes therein such that they do not cover the thin film filter 16. As shown in FIG. 3, a set of conductors 22 are connected to each of the layers of conductive material 18 and 20.

In operation, a light source (not shown) is directed at the thin film filter 16. As shown in FIG. 3, when no voltage is applied across the piezoelectric material, the thin film filter 16 acts as a conventional thin film filter. In this state, the thin film filter 16 permits light with a wavelength within a pass band to be transmitted through the filter. The pass band is set by the specific structure of the thin film filter 16 through conventional techniques.

The pass band of the thin film filter 16 is altered by varying the voltage applied across the piezoelectric material 10. The effect of applying a voltage across the piezoelectric material 10 will now be described with reference to FIGS. 4 and 5. It would be understood by those skilled in that art that the effect of the voltage on the piezoelectric material 10 is dependent upon the piezoelectric coefficient of the material. It would also be understood that a piezoelectric material with a negative coefficient would response in a manner opposite to that of a material with a positive coefficient. For the purpose of illustration, the embodiment illustrated in FIGS. 4 and 5 has a piezoelectric material with a positive piezoelectric coefficient.

With reference to FIG. 4, when a positive voltage is applied across the piezoelectric material 10, the piezoelectric properties of the piezoelectric material cause it to compress in the direction of the electric field created by the voltage applied. This results in the piezoelectric layer becoming thinner as is evident by comparing FIGS. 3 and 4. The compression of the piezoelectric material 10 in this direction results in the expansion of the piezoelectric material in directions orthogonal to the electric field thereby resulting in the cross-sectional area of the hole 14 being decreased. As a result, the thickness of the thin film filter 16 is increased, as can be seen on comparing FIGS. 3 and 4, by the stresses created about its periphery by the impinging portions of the piezoelectric material 10. Accordingly, the filtering properties of the thin film filter 16 are altered such that the pass band of the filter is shifted to permit transmission of light with a higher wavelength.

Conversely, as shown in FIG. 5, when a negative voltage is applied across the piezoelectric material 10, the piezoelectric material expands in the direction of the electric field thereby causing the piezoelectric material to compress in directions orthogonal to the electric field. Accordingly, in this state, the piezoelectric layer is thicker and the cross-sectional area of the hole 14 is increased thereby causing the thickness of the thin film filter 16 to decrease. Again, the filtering properties of the thin film filter 16 are altered. When the thickness of the thin film filter 16 is decreased, the pass band of the filter is shifted to permit transmission of light with a lower wavelength. Accordingly, the pass band of the thin film filter 16 can be adjusted by varying the voltage applied across the piezoelectric material 10.

This embodiment of the invention can be used as a tunable filter, a switch or a modulator. As a true tunable filter, the pass band of the filter is varied by altering the voltage applied across the piezoelectric material 10. The dynamic range of the tunable filter is not as large as conventional tunable filters; however, the response time of the embodiment of the invention is greater and it has no polarization dependency. Preferable, the embodiment of the invention is used simply to fine tune a fixed filter in situations where the dynamic range need not be large such as when compensation for changes, such as temperature, in the environment is required.

Figure 7:
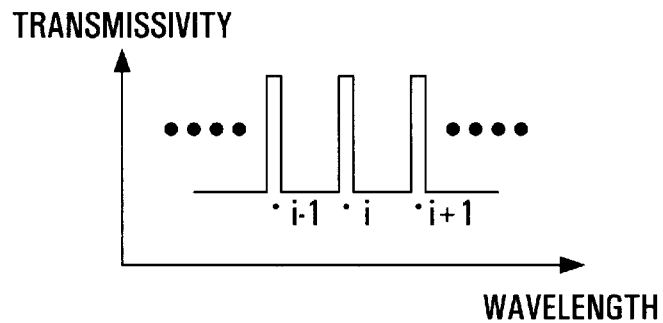
FIG. 7 is a diagram of transmissivity against wavelength to explain how switching between optical channels may be achieved using the invention.

In operation as a switch, the pass band of the thin film filter 16 and the wavelength of the incoming light are selected such that the tunable filter 8 can be alternated between an on state and an off state. In the on state, wherein a first voltage is applied across the piezoelectric material 10, the wavelength of the incoming light is such that it is within the pass band of the thin film filter 16 thereby permitting transmission of the light through the thin film filter. In the off state, wherein a second voltage is applied across the piezoelectric material 10, the resulting change in the thickness of the thin film filter 16 is sufficient to shift the pass band of the thin film filter such that the wavelength of the incoming light is outside the pass band. In this state the light is completely absorbed by the filter. Accordingly, the tunable filter 8 can be operated as an optical switch by simply varying the voltage across the piezoelectric material 10 between the first and second voltage. If the voltage applied to the piezoelectric layer is large enough the centre wavelength of the filter could be switched from one WDM channel into another WDM channel. For example, the pass band could switch from i to i−1 or i+1 etc. as illustrated in FIG. 7.

Figure 8:
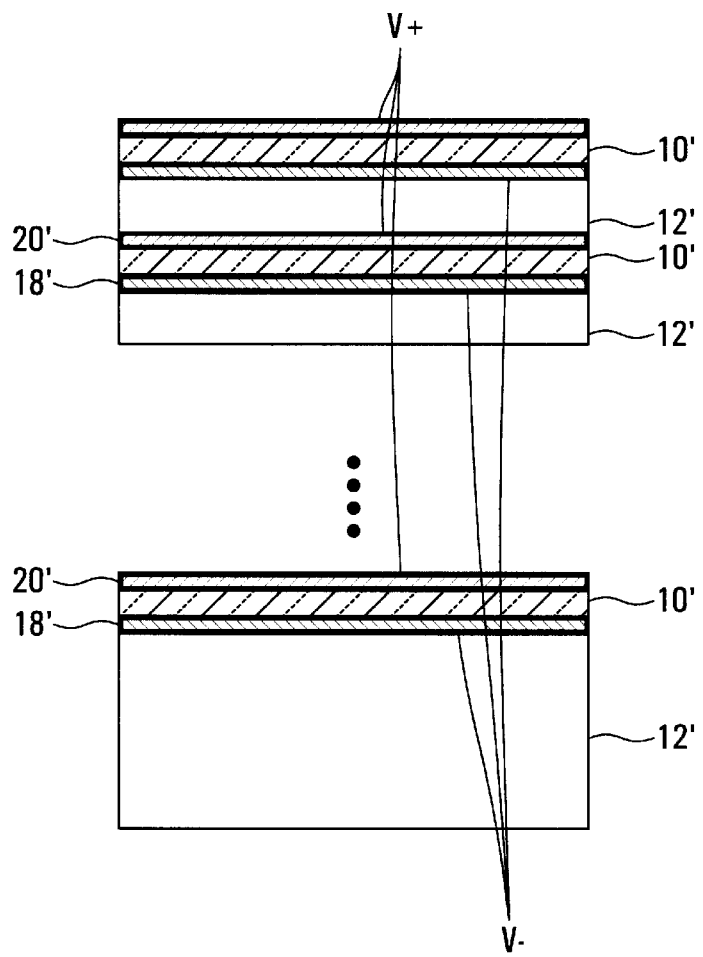
FIG. 8 is a side view of an alternative arrangement of piezoelectric material used in the invention in which many thin layers of piezoelectric material are used.

In operation as a modulator, the wavelength of the incoming light and the voltage to be applied across the piezoelectric material 10 are selected. However, the voltage to be applied is varied between a minimum voltage and a maximum voltage. The minimum voltage is selected such that pass band of the thin film filter 16 is positioned in the light spectrum so that a predetermined minimum intensity of light is transmitted through the filter. Similarly, the maximum voltage is selected such that pass band of the thin film filter 16 is positioned in the light spectrum so that a predetermined maximum intensity of light is transmitted through the filter. In operation, the voltage is varied within the range between the minimum voltage and maximum voltage such that the desired output light signal is achieved. For a high bit rate modulator it may be necessary to construct a "multi-layer sandwich" piezoelectric structure instead of a single piezoelectric layer. FIG. 8 illustrates such an arrangement from which it can be seen that on the substrate 12 are disposed a first layer 10' of piezoelectric material with electrodes 18' and 20' disposed on either side of the layer 10' followed by one or more sandwiches, comprising a thin transparent substrate 12', further piezoelectric layer 10' and further electrodes 18' and 20', stacked on top. The piezoelectric layers 10' are all much thinner than the single layer 10 used in the first embodiment. This provides a faster response time as well as reducing the required signal voltage. For clarity, the thin film filter has been omitted from FIG. 8. The thin film filter would be provided in exactly the same manner as shown in FIGS. 1–5 except that the single layer of piezoelectric material surrounding the optical filter would be replaced with the multi-layer arrangement of FIG. 8.

Figure 6:
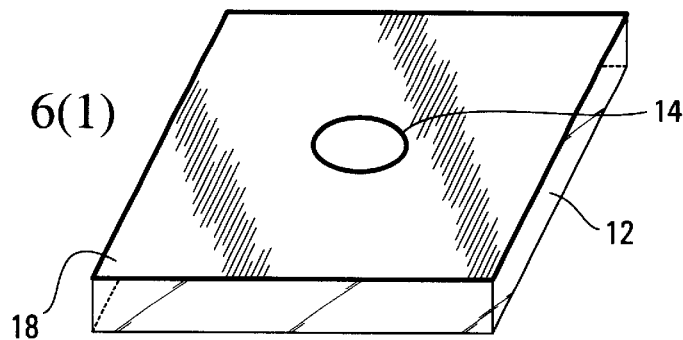
FIG. 6 is a schematic drawing illustrating the fabrication of the tunable optical filter shown in FIG. 2.
Figure 6:
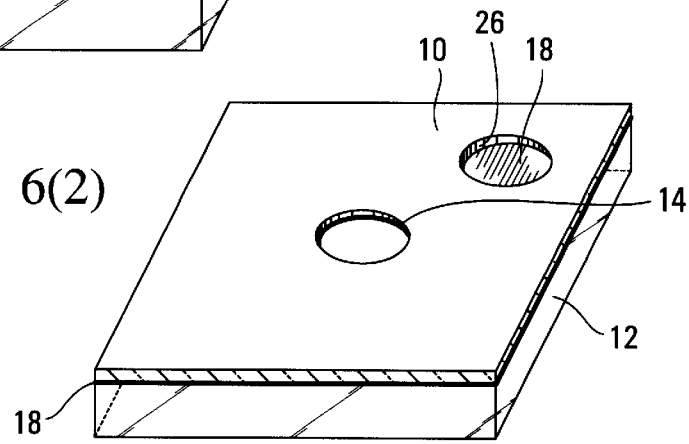
Figure 6:
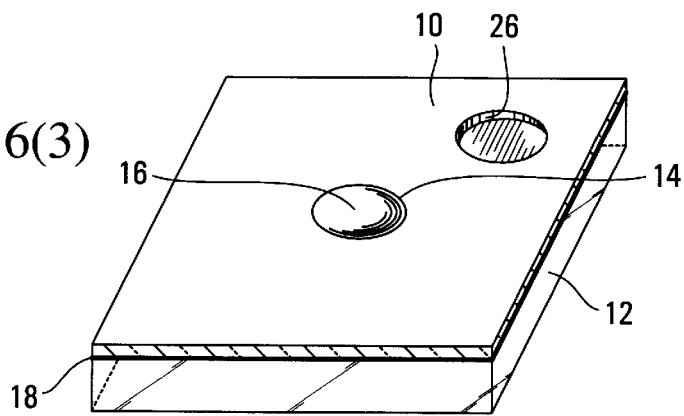
Figure 6:
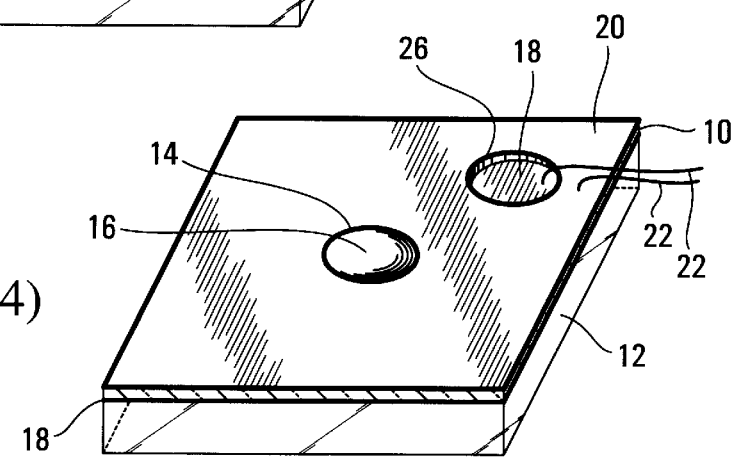

FIG. 6 provides a schematic drawing illustrating the fabrication of a tunable optical filter in accordance with an embodiment of the invention. As shown in step 1, the electrode 18 is deposited on the transparent substrate 12. The electrode is deposited by a vacuum deposit or other known technique. The hole 14 is opened in the electrode 18 using a known photolithography process. As shown in step 2, the piezoelectric material 10 is then deposited onto electrode 18 by a vacuum deposit or other known technique. The hole 14 is masked during the process so that no piezoelectric material is deposited therein. A second hole 26 is then opened in the piezoelectric material 10 using a photolithography process such that the electrode 18 is exposed through the piezoelectric material 10. The hole 26 must be of a sufficient size to accommodate the welding of a conductor to electrode 18. With reference to step 3, the thin film filter 16 is deposited within hole 14 by a vacuum deposit or other known technique. The entire surface of the piezoelectric material 10 and the hole 26 are masked such that only the hole 14 is exposed to the process. If desired, an adhesive (not shown) can be placed around the periphery of hole 14 to improve the adhesion between the thin film filter 16 and the piezoelectric material 10. As illustrated in step 4 the second electrode 20 is then deposited on the piezoelectric material 10 by vacuum deposit or other know technique. During this process, both hole 14 and hole 26 are masked. Conductors 22 are then welded to electrode 20 and electrode 18 through hole 26.

Figure 9:
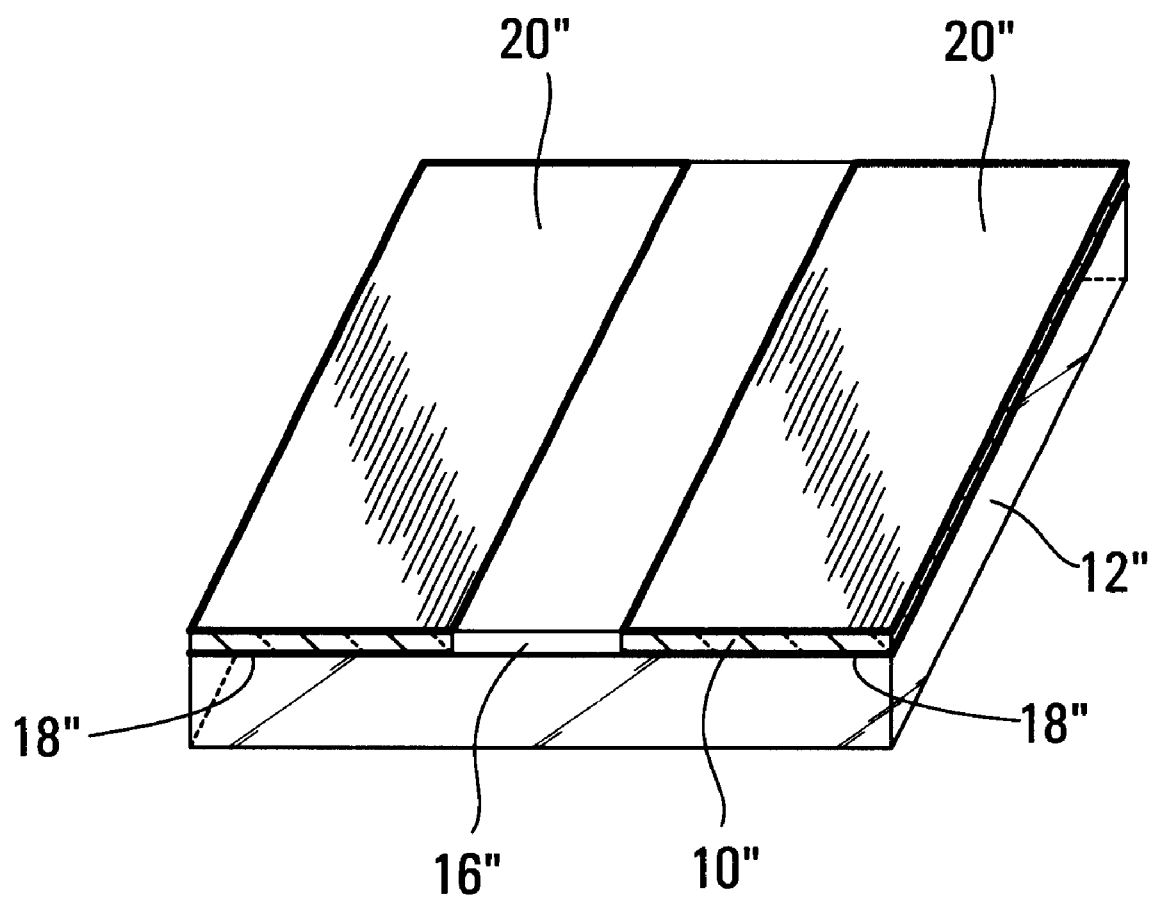
FIG. 9 is a perspective view of a tunable optical filter according to another embodiment of the invention.

Reference is made now to FIG. 9 which shows a novel tunable optical filter according to the invention which differs from the embodiment shown in FIGS. 2–5 in that, instead of the piezoelectric material completely surrounding the thin film filter the thin film filter is formed as a strip 16" with the piezoelectric material 10" provided on both long edges of the strip 16". The short edges of the strip 16' are not surrounded by piezoelectric material and are exposed. Otherwise the structure and operation is similar to the first embodiment with a transparent substrate 12", first electrodes 18" and second electrodes 20". Of course, the multi-layer structure of FIG. 8 could be used for the piezoelectric material.

It will be understood by those skilled in the art that numerous alterations, modifications and variations to the above embodiments can be made without departing from the substance of the invention.

What is claimed is:

1. A tunable optical filter comprising:
   a thin film filter adapted to filter a light beam, the thin film filter having a cross-sectional area and a periphery;
   a piezoelectric tuning member attached to the periphery of the thin film filter; and
   means for varying the configuration of the piezoelectric tuning member such that the cross-sectional area of the thin film filter is varied thereby changing the thickness of the thin film filter in the direction of travel of the light beam.

2. A tunable optical filter according to claim 1 wherein the thin film filter is disposed within a hole through the piezoelectric tuning member.

3. A tunable optical filter according to claim 2 wherein the hole within the piezoelectric tuning member has a circular cross-section.

4. A tunable optical filter according to claim 3 wherein the means for varying the configuration of the piezoelectric tuning member comprises:
   a) first and second electrodes positioned on opposing sides of the piezoelectric tuning member; and
   b) conductors connected to the first and second electrodes, the conductors being connectable to a voltage source whereby variation of the voltage applied across the electrodes results in a change in the configuration of the piezoelectric tuning member.

5. A tunable optical filter according to claim 3, further comprising a transparent substrate carrying the piezoelectric tuning member and the thin film filter.

6. A tunable optical filter according to claim 2 wherein the means for varying the configuration of the piezoelectric tuning member comprises:
   a) first and second electrodes positioned on opposing sides of the piezoelectric tuning member; and
   b) conductors connected to the first and second electrodes, the conductors being connectable to a voltage source whereby variation of the voltage applied across the electrodes results in a change in the configuration of the piezoelectric tuning member.

7. A tunable optical filter according to claim 2, further comprising a transparent substrate carrying the piezoelectric tuning member and the thin film filter.

8. A tunable optical filter according to claim 2, wherein the piezoelectric tuning member is secured to the periphery of the thin film filter by an adhesive.

9. A tunable optical filter according to claim 2 wherien the piezoelectric tuning member comprises a single layer of piezoelectric material.

10. A tunable optical filter according to claim 2 wherein the piezoelectric tuning member comprises multiple layers of piezoelectric material.

11. A tunable optical filter according to claim 1 wherein the means for varying the configuration of the piezoelectric tuning member comprises:
   a) first and second electrodes positioned on opposing sides of the piezoelectric tuning member; and
   b) conductors connected to the first and second electrodes, the conductors being connectable to a voltage source whereby variation of the voltage applied across the electrodes results in a change in the configuration of the piezoelectric tuning member.

12. A tunable optical filter according to claim 11 further comprising a transparent substrate carrying the piezoelectric tuning member, the thin film filter and the first and second electrodes.

13. A tunable optical filter according to claim 1, further comprising a transparent substrate carrying the piezoelectric tuning member and the thin film filter.

14. A tunable optical filter according to claim 1, wherein the piezoelectric tuning member is secured to the periphery of the thin film filter by an adhesive.

15. A tunable optical filter according to claim 1 adapted to operate over a small dynamic of tuning range whereby fine tuning of a fixed wavelength filter is obtained.

16. A tunable optical filter according to claim 1 adapted to operate over a large dynamic tuning range whereby different distinct passbands may be achieved.

17. A tunable optical filter according to claim 1 adapted to operate as a switch.

18. A tunable optical filter according to claim 1 adapted to operate as a modulator.

19. A tunable optical filter according to claim 18 wherein the piezoelectric tuning member comprises multiple layers of piezoelectric material.

20. A tunable optical filter according to claim 1 wherein the thin film filter is provided as a strip with the piezoelectric tuning member being provided on opposite sides of the strip.

21. A tunable optical filter according to claim 20 wherein the piezoelectric tuning member comprises a single layer of piezoelectric material.

22. A tunable optical filter according to claim 20 wherein the piezoelectric tuning member comprises multiple layers of piezoelectric material.

23. A tunable optical filter according to claim 1 wherein the piezoelectric tuning member comprises a single layer of piezoelectric material.

24. A tunable optical filter according to claim 1 wherein the piezoelectric tuning member comprises multiple layers of piezoelectric material.

25. A tunable optical filter according to claim 1 wherein the piezoelectric tuning member is secured to the periphery of the thin film filter by a non-adhesive bond.

26. A tunable optical filter comprising:
   a transparent substrate;
   a layer of piezoelectric material having a through hole;
   a thin film filter adapted to filter a light beam, the thin film filter being disposed in the through hole of the layer of piezoelectric material and having a periphery contiguous with and joined to the edge of the hole;
   a first electrode positioned between the layer of piezoelectric material and the substrate and having a through hole aligned with the hole of the layer of piezoelectric material;
   a second electrode disposed on an opposite surface of the layer of piezoelectric material and having a through hole aligned with the hole of the layer of piezoelectric material; and
   conductors respectively bonded to the first and second electrodes and connectable to a voltage source whereby varying the voltage applied across the electrodes results in a change in the dimensions of the piezoelectric layer such that the cross-sectional area of the thin film filter is varied thereby causing a resultant change in the thickness of the thin film filter.

27. A tunable optical filter according to claim 26, wherein the piezoelectric tuning member is secured to the periphery of the thin film filter by an adhesive.

28. A method of making a tunable optical filter comprising the steps:
   depositing a first electrode on a transparent substrate;
   opening a first through hole in the first electrode;
   depositing a layer of piezoelectric material onto the first electrode such that the first through hole extends through the layer of piezoelectric material;
   opening a second through hole in the layer of piezoelectric material at a location spaced apart from the first through hole;
   depositing within the first through hole a thin film filter such that the periphery of the film filter is contiguous with and attached to the periphery of the first through hole;
   depositing a second electrode on the layer of piezoelectric material while masking the thin film filter and the second through hole; and
   bonding a first conductor passing through the second through hole to the first electrode and bonding a second conductor to the second electrode.

29. A method according to claim 28 further comprising the step of applying an adhesive around the periphery of the first through hole prior to depositing the thin film filter.

30. A tunable optical filter comprising:
   a thin film filter having an optical thickness, a cross-sectional area and a periphery;
   a piezoelectric tuning member contiguous with the periphery of the thin film filter; and
   means for applying a voltage to change dimensions of the piezoelectric tuning member to cause a corresponding change in the cross-sectional area of the thin film filter thereby changing the optical thickness of the thin film filter.

* * * * *

UNITED STATES PATENT AND TRADEMARK OFFICE
CERTIFICATE OF CORRECTION

PATENT NO. : 6,396,632 B1  Page 1 of 1
DATED : May 28, 2002
INVENTOR(S) : Wen Liu et al.

It is certified that error appears in the above-identified patent and that said Letters Patent is hereby corrected as shown below:

Column 4,
Line 49, change "the invention is greater" to -- the invention is faster --

Column 7,
Lines 25 and 28, change "dynamic of tuning range" to -- dynamic range of tuning --

Signed and Sealed this

Eleventh Day of March, 2003

JAMES E. ROGAN
*Director of the United States Patent and Trademark Office*